US012202633B2

United States Patent
Cai et al.

(10) Patent No.: US 12,202,633 B2
(45) Date of Patent: *Jan. 21, 2025

(54) HEAT DISSIPATION STRUCTURE, HEAT DISSIPATION METHOD AND DEVICE, AERIAL VEHICLE, AND READABLE STORAGE MEDIUM

(71) Applicant: SZ DJI TECHNOLOGY CO., LTD., Shenzhen (CN)

(72) Inventors: Zhiwei Cai, Shenzhen (CN); Yawen Zhang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/514,744

(22) Filed: Nov. 20, 2023

(65) Prior Publication Data
US 2024/0083571 A1 Mar. 14, 2024

Related U.S. Application Data

(63) Continuation of application No. 16/931,251, filed on Jul. 16, 2020, now Pat. No. 11,820,496, which is a (Continued)

(51) Int. Cl.
*B64U 30/20* (2023.01)
*B64U 10/14* (2023.01)
(Continued)

(52) U.S. Cl.
CPC ............ *B64U 30/20* (2023.01); *B64U 10/14* (2023.01); *B64U 20/87* (2023.01); *B64U 50/19* (2023.01); *B64U 70/90* (2023.01); *B64U 2101/30* (2023.01)

(58) Field of Classification Search
CPC ....... B64C 27/08; B64C 39/024; B64D 47/08; B64D 27/24; B64D 29/04; B64D 33/08;
(Continued)

(56) References Cited

U.S. PATENT DOCUMENTS 5,330,034 A * 7/1994 Rancourt ................ B64C 25/36
188/71.6
6,067,229 A * 5/2000 Johnson ............. H05K 7/20409
361/689
(Continued)

FOREIGN PATENT DOCUMENTS

CN 204642144 A 9/2015
CN 105939930 A 9/2016
(Continued)

OTHER PUBLICATIONS

The World Intellectual Property Organization (WIPO) International Search Report for PCT/CN2018/073510 Sep. 25, 2018 8 pages.

*Primary Examiner* — Medhat Badawi
(74) *Attorney, Agent, or Firm* — ANOVA LAW GROUP, PLLC

(57) ABSTRACT

A heat dissipation structure includes a housing configured to accommodate a heating element of an aerial vehicle. The housing includes a first air vent configured to guide an airflow into the housing and a second air vent configured to guide the airflow out of the housing. The airflow includes a propeller-generated airflow generated by a propeller of the aerial vehicle during rotation. The housing is located at an end of an arm of the aerial vehicle, away from the propeller in a longitudinal direction of the arm. A projection of the housing on a plane on which an area of rotation of the propeller lies at least partially overlaps the area of rotation of the propeller.

20 Claims, 5 Drawing Sheets

Related U.S. Application Data continuation of application No. PCT/CN2018/073510, filed on Jan. 19, 2018.

(51) Int. Cl.
  *B64U 20/87* (2023.01)
  *B64U 50/19* (2023.01)
  *B64U 70/90* (2023.01)
  *B64U 101/30* (2023.01)

(58) Field of Classification Search
  CPC ........ B64U 10/13; B64U 30/20; B64U 50/19; B64U 2101/30; B64U 10/14; B64U 20/87; B64U 70/90; Y02T 50/60; G06F 1/206
  See application file for complete search history.

(56) References Cited

U.S. PATENT DOCUMENTS

| | | | | |
|---|---|---|---|---|
| 6,575,402 | B1* | 6/2003 | Scott | B64C 27/20 244/12.3 |
| 8,123,460 | B2* | 2/2012 | Collette | B64D 13/006 361/699 |
| 9,764,829 | B1* | 9/2017 | Beckman | B64U 50/30 |
| 9,764,833 | B1* | 9/2017 | Tighe | B64D 13/006 |
| 10,150,560 | B2* | 12/2018 | Tighe | B64D 13/006 |
| 10,358,230 | B2* | 7/2019 | Sahu | B64C 39/024 |
| 10,669,042 | B2* | 6/2020 | Molnar | B64D 47/06 |
| 10,698,295 | B2* | 6/2020 | Yu | B64C 39/024 |
| 10,906,652 | B2* | 2/2021 | Ku | G06F 1/203 |
| 11,348,060 | B2* | 5/2022 | Briggs | G08G 5/0091 |
| 11,524,775 | B2* | 12/2022 | Sun | B64C 39/024 |
| 2006/0289532 | A1* | 12/2006 | Hsu | F04D 25/04 219/757 |
| 2009/0212157 | A1* | 8/2009 | Arlton | B64U 40/20 701/2 |
| 2010/0021288 | A1* | 1/2010 | Collette | B64C 39/024 415/176 |
| 2013/0287577 | A1* | 10/2013 | Lin | B64U 20/40 416/210 R |
| 2015/0211490 | A1* | 7/2015 | Airoldi | H02K 7/183 290/1 B |
| 2016/0129998 | A1* | 5/2016 | Welsh | B64C 27/20 244/12.3 |
| 2016/0152345 | A1* | 6/2016 | Molnar | B64C 27/08 244/39 |
| 2016/0311526 | A1* | 10/2016 | Geise | B64C 27/08 |
| 2017/0240291 | A1* | 8/2017 | Kim | B64U 10/14 |
| 2017/0327224 | A1* | 11/2017 | Phan | B64D 27/02 |
| 2018/0094876 | A1* | 4/2018 | Swanson | F02C 7/12 |
| 2018/0111685 | A1* | 4/2018 | Tian | B64C 39/024 |
| 2018/0170553 | A1* | 6/2018 | Wang | B64U 20/92 |
| 2018/0244388 | A1* | 8/2018 | Yu | H05K 7/1427 |
| 2018/0259429 | A1* | 9/2018 | Adams | B64C 39/024 |
| 2018/0352170 | A1* | 12/2018 | Zhao | H04N 23/45 |
| 2019/0033932 | A1* | 1/2019 | Ku | B64U 50/19 |
| 2019/0217939 | A1* | 7/2019 | Xiong | H05K 5/0008 |
| 2019/0229585 | A1* | 7/2019 | Hsing | H02K 5/207 |
| 2019/0252938 | A1* | 8/2019 | Park | H02K 5/207 |
| 2019/0300171 | A1* | 10/2019 | Morita | G03B 21/16 |
| 2020/0010200 | A1* | 1/2020 | Chen | B64D 13/006 |
| 2020/0052556 | A1* | 2/2020 | Luo | H02K 7/14 |
| 2020/0102061 | A1* | 4/2020 | Cai | B64D 47/00 |
| 2020/0164957 | A1* | 5/2020 | Xu | B64U 30/293 |
| 2020/0346745 | A1* | 11/2020 | Cai | B64C 39/024 |
| 2020/0346777 | A1* | 11/2020 | Tong | H05K 7/20172 |
| 2021/0125891 | A1* | 4/2021 | Kajihara | H01L 21/4821 |
| 2021/0188420 | A1* | 6/2021 | Louie | B64U 60/40 |
| 2021/0221536 | A1* | 7/2021 | Minh Chung | B64C 39/04 |
| 2022/0041275 | A1* | 2/2022 | Tian | B64U 30/10 |
| 2024/0083571 | A1* | 3/2024 | Cai | B64U 10/14 |

FOREIGN PATENT DOCUMENTS

| | | |
|---|---|---|
| CN | 106672225 A | 5/2017 |
| CN | 206273035 U | 6/2017 |
| CN | 107079102 A | 8/2017 |
| CN | 107113997 A | 8/2017 |
| CN | 206704565 U | 12/2017 |
| CN | 206813317 U | 12/2017 |
| CN | 206865924 U | 1/2018 |
| CN | 206885332 U | 1/2018 |
| CN | 206895092 U | 1/2018 |

* cited by examiner

HEAT DISSIPATION STRUCTURE, HEAT DISSIPATION METHOD AND DEVICE, AERIAL VEHICLE, AND READABLE STORAGE MEDIUM

CROSS-REFERENCE TO RELATED APPLICATIONS

This application is a continuation of application Ser. No. 16/931,251, filed Jul. 16, 2020, which is a continuation of International Application No. PCT/CN2018/073510, filed Jan. 19, 2018, the entire contents of both of which are incorporated herein by reference.

TECHNICAL FIELD

The present disclosure relates to the field of heat dissipation technology and, in particular, to a heat dissipation structure, a heat dissipation method and device, an unmanned aerial vehicle (UAV), and a readable storage medium.

BACKGROUND

A UAV is an unmanned aircraft operated by a radio remote control device or a remote control device to perform a mission. In recent years, UAVs have been developed and applied in many fields, such as civilian, industrial and military applications.

In order to improve the user experience and enhance safety, a lot of electronic components are used inside the body of the UAV or the power consumption of the electronic components is increased. However, more heat will be generated inside the body. If the heat cannot be dissipated in time, it will most likely cause the UAV to malfunction.

SUMMARY

In accordance with the disclosure, there is provided a heat dissipation structure including a housing configured to accommodate a heating element of an unmanned aerial vehicle (UAV). The housing includes a first air vent and a second air vent. The first air vent is configured to guide an airflow into the housing. The airflow includes a propeller-generated airflow generated by a propeller of the UAV during rotation. A side projection of the first air vent on a side of the housing at least partially overlaps a side projection of the propeller on the side of the housing. The second air vent is configured to guide the airflow out of the housing.

Also in accordance with the disclosure, there is provided an unmanned aerial vehicle (UAV) including a housing, a heating element accommodated in the housing, an arm connected to the housing, and a propeller connected to the arm. The housing includes a first air vent and a second air vent. The first air vent is configured to guide an airflow into the housing. The airflow includes a propeller-generated airflow generated by the propeller. A side projection of the first air vent on a side of the housing at least partially overlaps a side projection of the propeller on the side of the housing. The second air vent is configured to guide the airflow out of the housing.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts.

DETAILED DESCRIPTION OF THE EMBODIMENTS

The technical solutions in the example embodiments of the present disclosure will be described clearly and completely with reference to the accompanying drawings. The described embodiments are only some of the embodiments of the present disclosure, rather than all the embodiments. Based on the embodiments of the present disclosure, all other embodiments obtained by a person of ordinary skill in the art without creative efforts shall fall within the scope of the present disclosure.

Example embodiments will be described with the reference to the accompanying drawings, in which the same numbers refer to the same or similar elements unless otherwise specified. The implementations described in the following example embodiments do not represent all implementations consistent with the present disclosure. Rather, they are merely examples of devices and methods consistent with some aspects of the invention as detailed in the appended claims.

The terminology used in the present disclosure is for the purpose of describing particular embodiments only and is not to limit the present disclosure. The singular forms "a," "said," and "the" as used in this disclosure include the plural forms, unless the context clearly indicates otherwise. The term "and/or" refers to any or all possible combinations of one or more of the associated items. Unless otherwise noted, "front," "rear," "lower" and/or "upper" and similar words are for the convenience of description only and are not limited to one location or one spatial orientation. "Connected" or "connecting" and similar words are not limited to physical or mechanical connections, but may include electrical connections, whether direct or indirect.

A heat dissipation structure, an unmanned aerial vehicle (UAV) and a heat dissipation method of the present disclosure will be described in detail with reference to the accompanying drawings. In the case of no conflict, the features in the following examples and implementations can be combined with each other and referred to each other.

Figure 1:
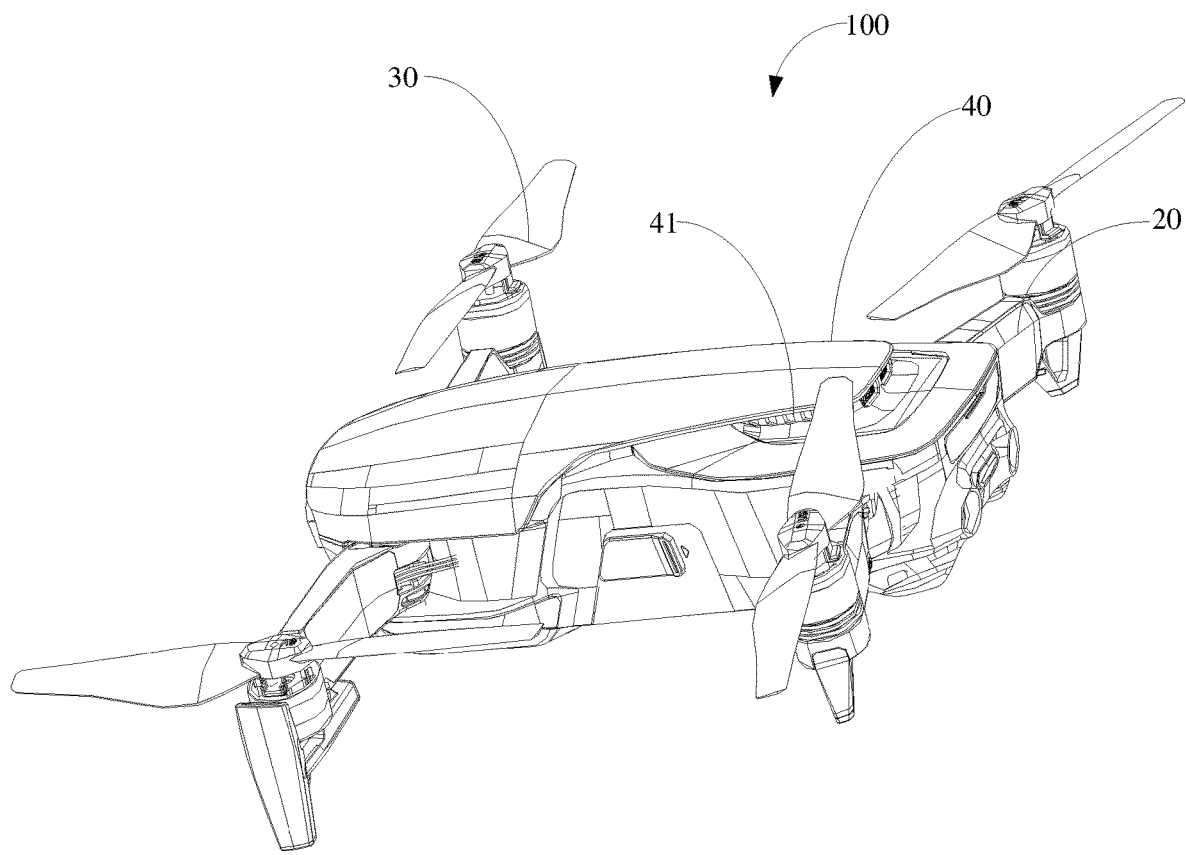
FIG. 1 is a schematic perspective view of an unmanned aerial vehicle (UAV) according to an embodiment of the disclosure.
Figure 2:
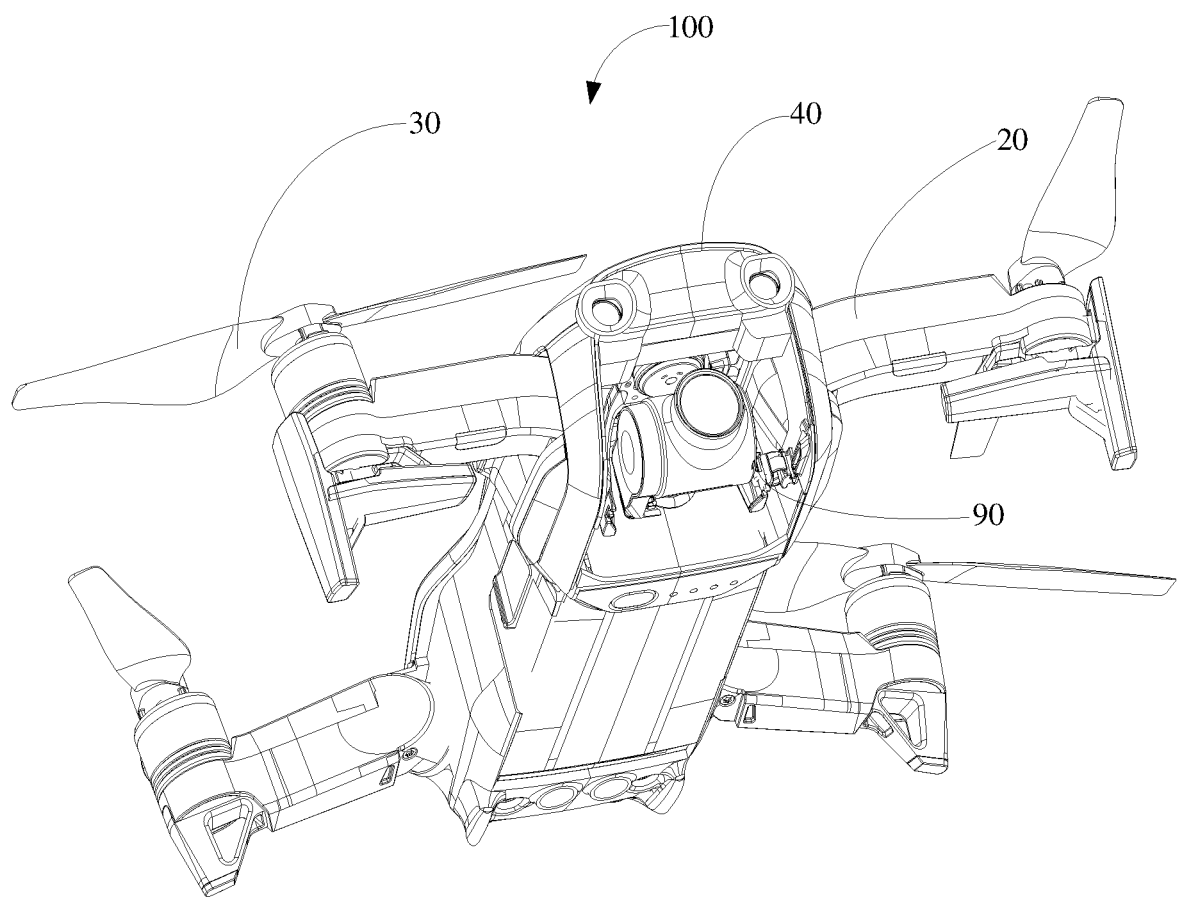
FIG. 2 is a schematic perspective view of the UAV shown in FIG. 1 from another perspective.

FIG. 1 is a schematic perspective view of a UAV 100 consistent with the disclosure. FIG. 2 is another schematic perspective view of the UAV 100 from another perspective. The UAV 100 can be used for aerial photography, mapping, and monitoring, but is not limited thereto. In some other embodiments, for example, the UAV 100 can also be used for agriculture, express delivery, and providing network services. In some embodiments, the UAV 100 includes a body, an arm 20, a power assembly, a carrier 90 mounted under the body, and a stand. In order to enable those skilled in the art to better understand the technical solution and advantages of embodiments of the disclosure, the overall structure of the UAV is first introduced based on FIGS. 1 and 2 from different perspectives.

As shown in FIG. 1, the power assembly includes a propeller 30. The power assembly may further include a motor (not shown in FIG. 1) and an electronic speed control (ESC, not shown in FIG. 1). The propeller 30 is driven to rotate by the motor, thereby providing power for ascending, moving forward, rotating, etc. of the UAV 100. The propeller 30 may include a blade and a hub. The hub is fixed to the output shaft of the motor, and the blade is mounted on the hub. When the output shaft of the motor drives the hub to rotate, the blades mounted at the hub also follow the rotation to form an area of rotation, and guide the air around the propeller 30 toward the region below the area of rotation, that is, form a downwash flow to provide lift to the UAV 100. The area of rotation refers to, e.g., a planar circle area swept by a blade during rotating. The ESC can be used to control the operation of the motor and is electrically connected to the flight control circuit board described below to control the start/stop, rotation speed, steering, etc. of the motor according to the control signals sent by the flight control circuit board, thereby controlling the flight direction and speed of the UAV 100.

Further, there may be multiple propellers 30, thereby forming a multirotor UAV. In some embodiments, the plurality of propellers 30 may be arranged around the body, that is, the plurality of propellers 30 may be arranged at intervals on the outer edge of a housing 40 of the body. In some embodiments, the UAV 100 includes four propellers 30, and the four propellers 30 may be symmetrically arranged about the horizontal axis and the longitudinal axis of the UAV 100.

The arm 20 is used to connect the propeller 30 and the body. In some embodiments, the arm 20 may be a single hollow rod made of materials such as metal, plastic, or carbon fiber. In some other embodiments, the arm 20 may also be a plate-shaped structure or a solid rod. The propeller 30 is fixed to one end of the arm 20 away from the body, and the other end of the arm 20 is fixed to a housing 40 of the body to be described below. In some embodiments, the propeller 30 is detachably or rotatably installed at the end of the arm 20 away from the body, so as to facilitate storage and transportation of the UAV. Similarly, the other end of the arm 20 can also be detachably or rotatably connected to the housing 40 of the body, thereby improving the convenience of storage or transportation of the UAV.

In some embodiments, as shown in FIG. 1, the UAV is a multirotor UAV including a plurality of arms 20, and these arms 20 are arranged around the body of the UAV. The number of the power assemblies is the same as the number of the arms 20, and each propeller 30 is mounted at the end of one of the arms 20 away from, i.e., distal from, the body. For example, a mounting hole can be provided at the end of the arm 20 away from the body, and a motor mounting base can be provided at the mounting hole. The motor of the power assembly is fixed at the mounting base, and the hub of the propeller 30 is fixed at the output shaft of the motor. The ESC can be integrated with the motor, or the ESC can be installed in a chamber of the arm 20.

Further, as shown in FIG. 2, the UAV is a quadrotor UAV having a front end, a rear end opposite to the front end, and two sides of the body connecting the front and rear ends. A slot may be provided at the bottom of the front end of the UAV body and recess toward the inside of the UAV body, and an accommodation space of the slot can be used to accommodate the carrier 90 while satisfying the design of the UAV body. As a result, the space is fully used, and the carrier 90 can be protected by the accommodation space. The carrier 90 can be used to support a load. In the example shown in FIG. 2, the carrier 90 may be a gimbal, and the load may be an imaging device such as a camera, a video camera, an infrared camera, an ultraviolet camera, etc., an audio capture device, or other sensors. Further, the gimbal can be a two-axis gimbal or a three-axis gimbal, so that the gimbal can be adjusted to rotate around different axes, therefore the UAV 100 has multiple different shooting angles.

In some embodiments, in addition to the above-described mounting positions, the carrier 90 can also be disposed at the bottom of the rear end of the UAV body, which can be decided according to the UAV model, the body design and usage needs, and is not limited here.

A stand is used to support the UAV on the ground or on a platform on the ground when the UAV is landing, so as to prevent the housing 40 from contacting the ground or the platform on the ground, therefore the gimbal mounted at the bottom of the housing 40 or the housing 40 can be protected. The stand can be fixedly connected to the bottom of the housing 40, or can be disposed under the arm 20, or the bottom of the housing 40 and the arm 20 can be provided with a stand. The stand can be a buffer structure formed with soft rubber material.

Figure 3:
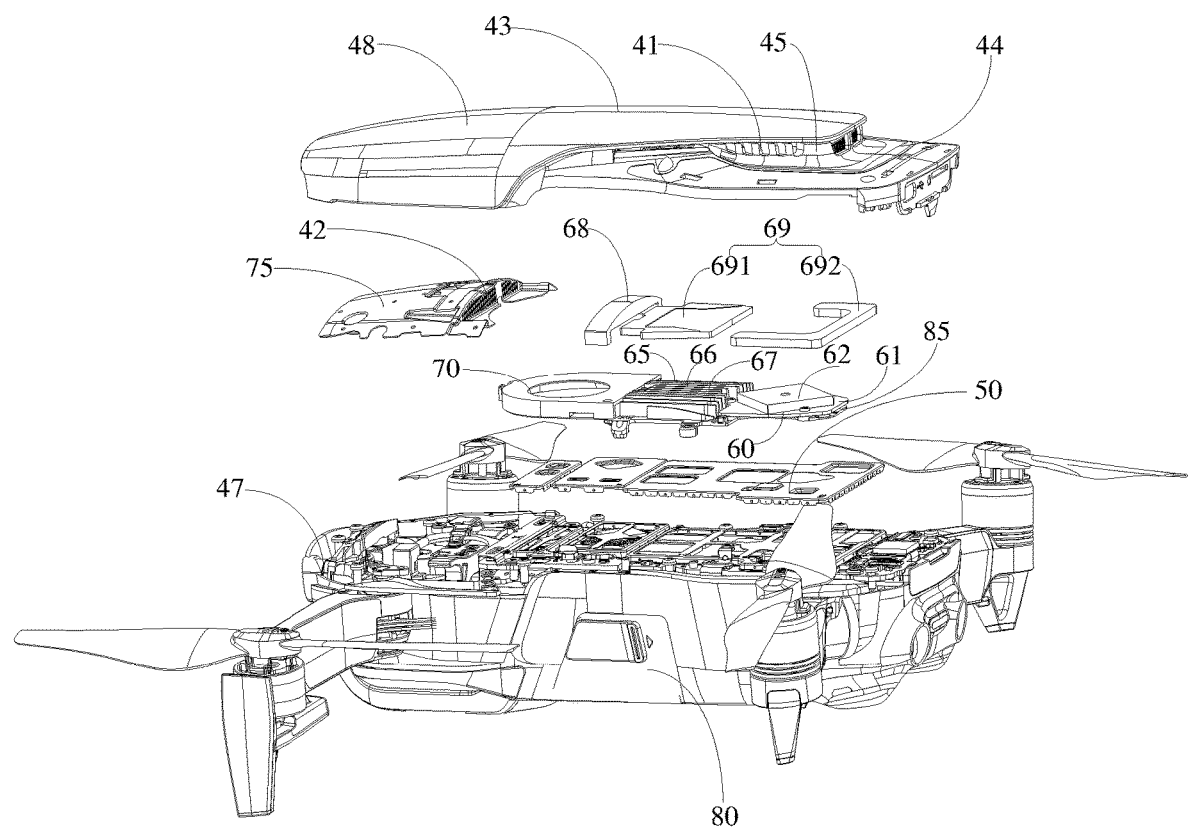
FIG. 3 is a schematic exploded perspective view of the UAV shown in FIG. 1.

FIG. 3 is an exploded perspective view of the UAV shown in FIG. 1. Referring to FIG. 3, the body is the main part of the UAV 100 and includes a housing 40 and a heating element 50 accommodated in the housing 40. In some embodiments, the heating element 50 may be any model, any type of electronic component, or integrated circuit that is installed in the housing 40 for the UAV to realize functions such as flight, shooting, positioning, and navigation. For example, a flight control circuit board, a gyroscope, a wireless receiving circuit, an image transmitting and receiving circuit electrically connected to the camera on the gimbal, etc. may be installed in the housing 40. In some embodiments, the heating element 50 is a flight control circuit board.

Due to the increasing number of electronic components or integrated circuits installed or integrated in the housing 40, the heat generated from the current UAV increases a lot compared to the heat generated from the UAV produced or developed before. In order for the UAV to work properly, it is necessary to dissipate the heat generated by the heating element 50 to the outside of the housing 40 as soon as possible, so as to reduce the temperature in the housing 40 to within the temperature range in which the heating element 50 can work normally.

The present disclosure provides a heat dissipation structure configured to dissipate heat from the heating element 50 of the UAV, so that the temperature of the heating element 50 is maintained within a normal working temperature range. The heat dissipation structure includes a housing 40 for accommodating the heating element 50 of the UAV 100, and the housing 40 is provided with a first air vent 41 and a second air vent 42. The first air vent 41 is used to guide the airflow generated when the propeller 30 of the UAV 100 rotates into the housing 40, so that the heat transfer happens between the airflow and the heating element 50, and then the airflow after the heat transfer is led out of the housing 40 from the second air vent 42 to achieve the heat dissipation effect on the heating element 50. The side projection of the first air vent 41 and the side projection of the propeller 30 at least partially overlap. The direction of the side projection here refers to the side direction of the UAV's body, that is, the projection of the first air vent 41 and the projection of the propeller 30 at least partially overlap when projecting to the side of the UAV's body.

During the flight of the UAV, the propeller 30 can form an area of rotation when rotating. On the one hand, when the propeller 30 rotates, the propeller 30 drives the surrounding air to move in the direction in which the propeller 30 rotates. Due to air resistance, part of the airflow rotating around the propeller 30 leaves the surface of the propeller 30 and runs along a tangential direction of the area of rotation. On the other hand, the air around the propeller 30 can also form a downwash flow below the area of rotation. Since the side projection of the first air vent 41 and the side projection of the propeller 30 at least partially overlap, based on this design, the airflow running along the tangential direction of the area of rotation, or the airflow running along the tangential direction of the area of rotation and the downwash flow can enter the housing 40 through the first air vent 41. Further, since the UAV 100 usually flies high in the sky, the temperature of the surrounding air is generally lower. The low-temperature airflow entering the housing 40 from the first air vent 41 can cool down the heating element 50 well and does not increase the noise of the UAV 100.

The housing 40 can be made into a circle, an oval, a rectangle, or another regular or irregular geometric shape. Based on the above description of the body of the UAV, correspondingly, the housing 40 has a front end and a rear end relative to the front end. The front end of the housing may be the nose of the UAV, and the rear end of the housing may be the tail of the UAV. In the example shown in the figures, the housing 40 has a rectangular shape with rounded corners. In some other embodiments, the housing 40 may have any other shape, and the first air vent 41 and the second air vent 42 may be disposed at the housing 40 of any shape.

As shown in FIG. 3, the housing 40 includes a casing 47 and a cover 48 that is engaged with the casing 47. The casing 47 and the cover 48 form an accommodation chamber to accommodate heating elements 50 and a battery 80 can be mounted at the bottom of the casing 47. The cover 48 may be the top of the housing 40, and the first air vent 41 is disposed at the cover 48 and located close to an end of the cover 48. The first air vent 41 may include two groups corresponding to the pair of propellers 30 provided at the rear end of the housing 40, and the two groups of the first air vents 41 may be symmetrical about the longitudinal axis of the housing 40, which is not limited here. In another embodiment, the two groups of first air vents 41 may be asymmetric about the longitudinal axis of the housing 40. In another embodiment, only one set of the first air vent 41 may be provided, corresponding to one of the propellers 30 provided at the rear end of the housing 40. In some other embodiments, the first air vents 41 may also be disposed at the front end of the cover 48, corresponding to a pair of propellers 30 or one of the propellers 30 provided at the front end of the housing 40.

One group of first air vents 41 may have one or more vent holes, and the shape of a vent hole may be circular, square, oval, or the like. The number, shape, size, etc. of the first air vent 41 are not limited in the present disclosure, as long as the airflow running along the tangential direction of the area of rotation of the propeller 30, or the airflow running along the tangential direction of the area of rotation of the propeller 30 and the downwash flow may be guided into the housing 40.

In some embodiments, since the first air vent 41 needs to guide the airflow, generated when the propeller 30 rotates, into the housing 40, the height of the upper end of the first air vent 41 may be higher than or equal to the height of the upper end of the propeller 30. Further, the lower end of the first air vent 41 may be not higher than the lower end of the propeller 30. In this way, more airflow running along the tangential direction of the area of rotation of the propeller 30 and/or downwash flow can enter the housing 40 from the first air vent 41, and the cooling and heat dissipation effect is better.

The first air vent 41 may adopt another design different from the structure design described above. For example, in one embodiment, the height of the upper end of the first air vent 41 may be lower than the height of the upper end of the propeller 30 and higher than the height of the lower end of the propeller 30, and the height of the lower end of the first air vent 41 is not higher than the height of the lower end of the propeller 30. In some other embodiments, the upper end of the first air vent 41 is higher than or equal to the upper end of the propeller 30, and the lower end of the first air vent 41 is higher than the lower end of the propeller 30 and lower than the upper end of the propeller 30. There is no limitation here.

In the example shown in FIG. 3, the cover 48 of the housing 40 is provided with a first plate 43, a second plate 44, and a connection wall 45 connecting the first plate 43 and the second plate 44. The first air vent 41 is disposed at the connection wall 45, and the platform height of the first plate 43 is different from the platform height of the second plate 44. In some embodiments, the platform height of the first plate 43 may be higher than the height of the upper end of the propeller 30, and the platform height of the second plate 44 may be lower than the height of the lower end of the propeller 30. Therefore, when the propeller 30 rotates to form the area of rotation, the projection of the second plate 44 on a plane on which the area of rotation lies may at least partially overlap the area of rotation. Further, due to the design of the platform height of the first plate 43, the height of the upper end of the first air vent 41 can be higher than or equal to the height of the upper end of the propeller 30. In this way, the downwash flow formed when the propeller 30 rotates hits the second plate 44 during the downward flow and changes the flow direction, and the part of the downwash flow after changing the flow direction enters the housing 40 through the first air vent 41. Therefore, on the basis of the airflow running along the tangential direction of the area of rotation of the propeller 30, the airflow into the housing 40 is increased, and the cooling effect is further improved.

In some embodiments, the top of the housing 40 may also have another shape, such as a curved surface or a spherical crown that gradually lowers from the middle of the top to the periphery. The first air vent 41 is disposed at a position corresponding to the area of rotation of the propeller 30, as long as the side projection of the first air vent 41 and the side projection of the propeller 30 at least partially overlap. Therefore, the first air vent 41 can guide the airflow generated when the propeller 30 of the UAV 100 rotates into the housing 40 through the first air vent 41.

In some embodiments, the second plate 44 may extend in a horizontal direction away from the connection wall 45 or obliquely downward away from the connection wall 45, so as not to block the airflow running along the tangential direction of the area of rotation of the propeller 30 entering the housing 40 through the first air vent 41. It can effectively change the flow direction of the downwash flow generated when the propeller rotates and make the part of the downwash flow after changing the flow direction enter the housing 40 through the first air vent 41.

In some embodiments, the connection wall 45 may be perpendicular to the first plate 43 and the second plate 44. In some other embodiments, the connection wall 45 may also be set obliquely relative to the first plate 43 and the second plate 44, which can be set according to the design of the housing 40 and not limited here.

Further, based on other height designs of the propeller 30 and the top of the UAV 100, the first air vent 41 may also be provided at the side wall of the UAV, which is not limited herein.

In the example shown in FIG. 3, the first plate 43, the second plate 44, and the connection wall 45 may be an integral piece formed integrally. In another embodiment, the first plate body 43, the second plate body 44, and the connection wall 45 may also be assembled parts.

In some embodiments, the first air vent 41 may be provided at an end of the housing 40 opposite to an end of the housing 40 connected to the carrier 90 that supports the load, and the second air vent 42 may be provided at a corresponding area of the housing 40 connected to the carrier 90, which is not limited thereto. For example, in some other embodiments, the first air vent 41 is provided at the end of the housing 40 connected to the carrier 90 that supports the load, and the second air vent 42 is provided at the end of the housing 40 opposite to the end of the housing 40 connected to the carrier 90. In some embodiments, the locations of the first air vent 41 and the second air vent 42 can be designed according to the specific needs. In some embodiments, as shown in FIG. 2, the carrier 90 is a gimbal, and the load is a camera. As shown in FIG. 3, the second air vent 42 is provided at a corresponding area of the housing 40 connected to the gimbal. An opening at one side of the second air vent 42 faces the corresponding area, and an opening at the other side of the second air vent 42 faces the chamber of the housing 40. Since the gimbal can be arranged at the bottom of the UAV, when observed from the bottom of the UAV 100, the corresponding area is the bottom area where the UAV 100 is connected to the gimbal.

In some embodiments, the carrier 90 may be provided at the bottom of the front end of the housing 40, and the first air vent 41 may be provided at the rear end of the housing 40. Since there is a slot for accommodating the gimbal at the connection area between the gimbal and the bottom of the housing 40, this part can be utilized to arrange the second air vent 42. That is, the second air vent 42 is provided at the slot of the bottom of the housing 40 and opens towards the inner chamber of the housing 40, so as to maintain the appearance of the original design of the UAV as much as possible, which is beneficial to simplify the manufacturing process of the housing 40, and can effectively use the original design process.

In some embodiments, in addition to the positions described above, the second air vent 42 can also be provided at other positions of the housing 40 in practical applications, as long as it can cooperate with the first air vent 41 to form a corresponding air duct for heat dissipation, which is not limited here.

In the example shown in FIG. 3, the housing 40 includes a shield 75, and the shield 75 is a part of the top of the housing 40, such as being connected to the cover 48 of the housing 40 (may be located below the cover 48). When the cover 48 is connected to the casing 47, the shield 75 can be directly disposed above the carrier 90, and a second air vent 42 can be provided at the shield 75. The opening direction of the second air vent 42 may be parallel to the vertical direction, so as to achieve efficient heat dissipation by simply modifying the structure of the product. In some other embodiments, the opening direction of the second air vent 42 may also be arranged along the horizontal direction or obliquely, which is not limited here.

In addition to the positions described above, in practical applications, the shield 75 may also be provided at the bottom of the housing 40. The shield 75 may serve as a part of the connection between the bottom of the housing 40 and the inner chamber of the housing 40, and may cooperate with the bottom of the housing 40 to form a slot for accommodating the carrier 90, which is not limited herein.

Further, the housing 40 may also be provided with a third air vent 46, which is used to cooperate with the first air vent 41. The third air vent 46 is provided near the end of the housing 40, that is, the end of the body of the UAV 100, so that part of the airflow formed when the propeller 30 rotates can also enter the housing 40 through the third air vent 46. The first air vent 41 and the third air vent 46 may be located at the same end of the body, and the third air vent 46 may not be coplanar with the first air vent 41. As shown in FIG. 3, both the first air vent 41 and the third air vent 46 may be located at the rear end of the body, but the first air vents 41 are located at both sides of the third air vent 46, and the second air vent 42 can be located at the front end of the body, so as to use at least part of the body to form a corresponding cooling air duct to improve the heat dissipation efficiency.

In practical applications, the first air vent 41 and the third air vent 46 may also cooperate to form one air vent, and the air vent may conform to the shape of the first air vent 41 and the third air vent 46, such as a U-shaped air vent. Other shapes are also possible, which are not limited here.

In some embodiments, as shown in FIG. 3, the heat dissipation structure further includes a heat sink 65 disposed at the housing 40, and the heat sink 65 is used to dissipate heat from the heating element 50. The heat sink 65 is provided with a plurality of heat dissipation fins 66, and a plurality of heat dissipation channels 67 are formed between the plurality of heat dissipation fins 66 to increase the heat dissipation area. The heat sink 65 can be fixed to the heating element 50 by thermal conductive adhesive or another manner, or it can be provided with a corresponding mounting portion, such as a bolt hole, so that the heat sink 65 can be fixed to the housing 40 or the heating element (such as flight control circuit board) through a bolt, thereby improving the connection strength of the heat sink 65.

During operation, after the UAV is started, the propeller 30 rotates, and the airflow generated when the propeller 30 rotates enters the interior of the housing 40 from the first air vent 41, and the airflow blows through the multiple heat dissipation channels formed by the heat sink 65 to exchange heat with the heat sink 65 and then flows out of the housing 40 from the second air vent 42, so as to bring the heat generated by the heating element 50 out of the housing 40.

In the example shown in FIG. 3, in order to reduce or eliminate the electromagnetic interference of the electromagnetic signal generated by the heating element 50 on the external circuit or the electromagnetic interference of the external electromagnetic signal on the heating element 50, the housing 40 is also provided with a shield cover 85. The shield cover 85 may be provided between the heat sink 65 and the heating element 50. A thermal conductive adhesive is provided between the shield cover 85 and the heat sink 65, and a heat dissipation boss (not shown in the figure) that cooperates with the heating element 50 is also provided on the shield cover 85. In this way, the heat of the heating element 50 can be quickly and efficiently conducted to the heat sink 65 via the shield cover 85.

Further, in some embodiments, as shown in FIG. 3, the heat dissipation structure further includes a cooling fan 70 provided at the housing 40. Based on the different models of the UAV and the internal structure design, the cooling fan can have different designs.

In some embodiments, the cooling fan 70 may be close to the first air vent 41 for discharging the inlet airflow from the first air vent 41 (this inlet airflow may include the airflow generated when the propeller 30 rotates) out of the second air vent 42. During the flight of the UAV 100, the airflow generated by the rotation of the propeller 30 will go through the first air vent 41 and be discharged out of the housing 40 through the second air vent 42. At this time, if the cooling fan is started, and the cooling direction of the cooling fan 70 is the same as the cooling direction of the airflow generated when the propeller 30 rotates, the heat dissipation efficiency is improved.

In some embodiments, as shown in FIG. 3, the cooling fan 70 is arranged close to the second air vent 42 for discharging the airflow from the second air vent 42 out of the first air vent 41. After the cooling fan 70 is started, the cold air is sucked in through the second air vent 42 and pressurized by the cooling fan 70 to form a high-pressure cooling airflow, then flows through the heat sink 65 to dissipate heat from the heating element 50, and then flows out of the housing 40 through the first air vent. In this manner, the cooling direction of the cooling fan 70 is opposite to the cooling direction of the airflow generated by the rotation of the propeller 30, but it can be understood that when the UAV flies, the airflow pressure generated by the rotation of the propeller 30 may be greater than the airflow pressure formed by the cooling fan 70. In order to save energy, the cooling fan 70 may not be started when the UAV flies and may be started for heat dissipation when the UAV is not flying but needs to be cooled.

In some embodiments, the cooling fan 70 may be glued on the shield cover 85 or the heating element 50, or another fixing manner may be used, which is not limited thereto. As described above, in some embodiments, the cooling fan 70 is arranged close to the second air vent 42. In these embodiments, if the second air vent 42 is disposed at the shield 75, the cooling fan 70 is located at a side of the shield 75. The shield 75 may be a dust shield and a plurality of grilles are provided at the second air vent 42 so as to let the cooling airflow in and out while blocking dust. The cooling fan 70 is a centrifugal fan. In some other embodiments, the cooling fan 70 may include an axial fan or another type of fan.

In some embodiments, as shown in FIG. 3, a wind shield boss 68 is provided between the cooling fan 70 and the heat sink 65, and the material of the wind shield boss 68 may include, but is not limited to, foam. The wind shield boss 68 is provided with an opening corresponding to the air vent on the side wall of the cooling fan 70, and the opening connects with a plurality of heat dissipation channels 67 formed by the heat sink 65. In some embodiments, the wind shield boss 68 can isolate the outside cold air flowing into the housing 40 and the outside cold air after heat transfer, thereby improving the heat dissipation efficiency of the cooling fan 70.

In order to cooperate with the design of the first air vent 41, or the design of the first air vent 41 and the third air vent 46, the heat dissipation structure further includes a shunt structure 60 provided at the housing 40, and the shunt structure 60 may be used to divide and guide the cooling airflow (the cooling airflow may be the airflow generated when the propeller 30 rotates (also referred to as "propeller-generated airflow") or the airflow generated when the cooling fan 70 rotates (also referred to as "fan-generated airflow") passing by the shunt structure 60, so as to discharge the cooling airflow out of the housing 40 efficiently in multiple directions. Referring to FIG. 3, the shunt structure 60 is close to the first air vent 41, and the shunting direction of the shunt structure 60 can correspond to the position direction of the first air vent 41 and the position direction of the third air vent 46, so that the cooling airflow can be discharged through the first air vent 41 and the third air vent 46 more effectively.

The shunt structure 60 includes an electronic device, but it is not limited thereto. For example, the shunt structure 60 may also be an internal structure provided in the housing 40 to guide the cooling airflow. In some embodiments, the shunt structure 60 may include a positioning device, such as a GPS device, a Beidou positioning device, and so on. The shunt structure 60 can also be another electronic device.

In the example shown in FIG. 3, the shunt structure 60 may be a GPS device, and the GPS device may be fixed to the shield cover 85 by fasteners. The shunt structure 60 can also be connected and fixed to the shield cover 85 or the heating element 50 or other elements by, for example, bonding. A first part 61 may be a circuit board, and a second part 62 may be a chip.

In some embodiments, in order to realize the shunt design of the shunt structure 60, in an embodiment, the shunt structure 60 includes the first part 61 and the second part 62 disposed at the first part 61. The first part 61 and the second part 62 cooperate to form a plurality of shunting directions. The plurality of shunting directions cooperate with the first air vent 41, or with the first air vent 41 and the third air vent 46, so that heat can be dissipated more efficiently.

In some embodiments, as shown in FIG. 3, the second part 62 may be a square structure, and the opposite angles of the square structure may be close to the side of the first part 61 respectively (e.g., instead of the parallel overlapping design of the second part 62 and the first part 61, the second part 62 is turned forty five degrees clockwise or counterclockwise relative to the first part 61). That is, a pair of adjacent sides of the second part 62 cooperate with the first part 61, so that airflows with directions of 45 degrees are formed along the adjacent sides of the second part 62 at one side of the first part 61, and another airflow direction is formed on the top of the second part 62. Therefore, the cooling airflow passing through the shunt structure 60 can be diverted and guided into three airflows. That is, the airflow directions of two adjacent sides of the square structure respectively correspond to the position directions of the corresponding first air vents 41, and the airflow direction at the top of the square structure corresponds to the position and direction of the third air vents 46. The second part 62 may also have another shape, such as a diamond shape, a triangular shape, etc., as long as the second part 62 has a structure that divides and guides the cooling airflow. The specific shape is not limited.

In some embodiments, as shown in FIG. 3, the heat dissipation structure further includes a wind shield 69, and the wind shield 69 is used to form a closed air duct from the heat dissipation channel 67 to the first air vent 41. The wind shield 69 includes a first part 691 and a second part 692. The first part 691 covers the heat sink 65 and closes the top of the heat dissipation channel 67. The second part 692 may have a U-shaped structure and surround the GPS device at the side away from the heat sink 65 and two adjacent sides, so that the cooling airflow is restricted to the closed air duct, and is discharged out of the housing 40 from the first air vent 41, or the first air vent 41 and the third air vent 46, to avoid the diffusion of the cooling airflow to the other locations of the housing 40, thereby improving the cooling efficiency of the heating element 50.

Figure 4:
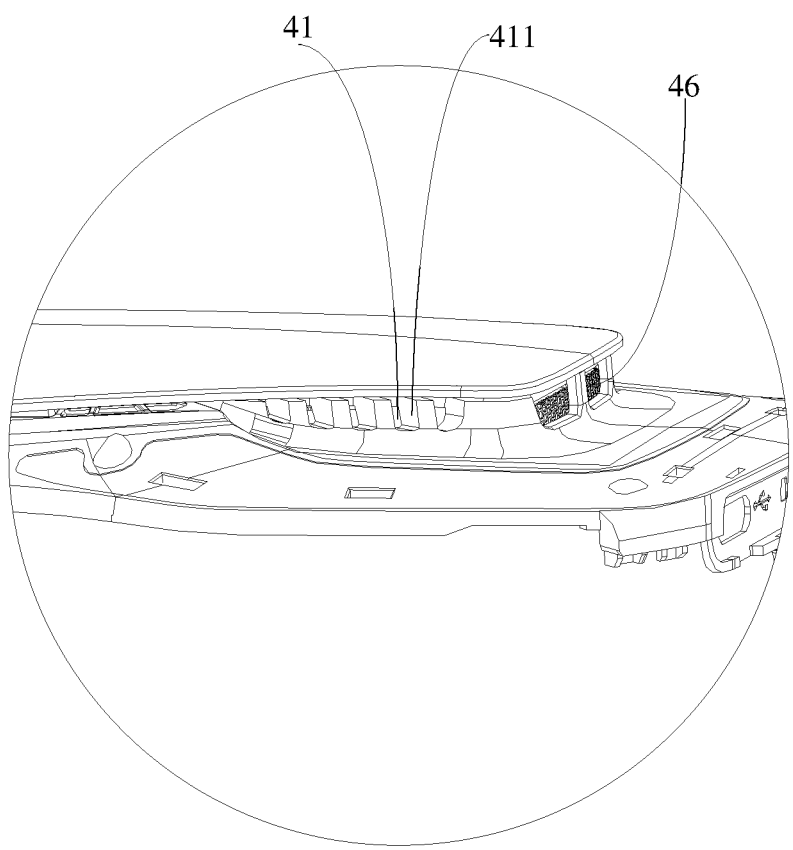
FIG. 4 is an enlarged view of a part of the cover of the UAV shown in FIG. 3.

FIG. 4 is an enlarged view of a part of the housing of the UAV described above in connection with FIG. 3. Referring to FIG. 4, the first air vent 41 is provided with a deflector 411 extending from the direction of the airflow generated when the propeller 30 rotates to the inside of the housing 40. The arrangement of the deflector 411 is conducive to guiding the airflow into the housing 40.

Further, the extension direction of the first air vent 41 is consistent with the direction of the airflow generated when the propeller 30 rotates, so that the airflow receives less resistance when entering the housing 40 through the first air vent 41, and more airflow can enter the housing 40, as a result, the cooling efficiency is high.

The UAV 100 needs heat dissipation in a flight state, and also needs heat dissipation in a standby state. The standby state refers to a state when the UAV 100 has been powered on and has not yet taken off. Based on the above structure, the heat dissipation manners of the UAV 100 in two states will be described separately.

When the UAV 100 is in a standby state, the cooling fan 70 may be used for heat dissipation. The cooling fan 70 is started and after the cooling fan 70 starts to rotate, the cooling airflow is sucked in through the second air vent 42. After the cooling airflow is pressurized by the cooling fan 70, it flows through the heat dissipation channels 67 through the opening of the wind shield boss 68, and exchange heat with the heating element 50 through the heat dissipation fins 66, and then is discharged from the first air vent 41 and the third air vent 46 under the dividing and guiding of the shunt structure 60. The cooling airflow can be divided into three airflows when passing through the shunt structure 60. One airflow flows through the top surface of the second part 62 and is discharged from the third air vent 46, and the other two airflows flow through the two adjacent sides of the second part 62 and are discharged from the first air vents 41 on both sides of the third air vent 46, thereby bringing the heat generated by the heating element 50 out of the body, lowering the temperature in the housing 40, and ensuring that the heating element 50 can work normally and stably. As shown in FIG. 3, the heat dissipation direction may be from the bottom of the front end of the UAV 100 to the front end of the second air vent 42 and to the rear end of the first air vent 41.

When the UAV 100 is in a flight state, the cooling fan 70 may be turned on or off. In some embodiments, in order to increase the endurance of the UAV, the cooling fan can be turned off. At this time, the propeller 30 rotates to generate an area of rotation, and an airflow running along the tangential direction of the area of rotation, or an airflow running along the tangential direction of the area of rotation and a downwash flow can enter the housing 40 through the first air vent 41. The airflow passes through the heat dissipation channels 67 of the heat sink 65 under the guidance of the shunt structure 60, and exchanges heat with the heating element 50 through the heat dissipation fins 66, and then is discharged from the second air vent 42, thereby bringing the heat generated by the heating element 50 out of the body, lowering the temperature in the housing 40, and ensuring that the heating element 50 can work normally and stably. As shown in FIG. 3, the heat dissipation direction may be from the first air vent 41 at the rear end of the UAV 100 to the second air vent 42 at the front end to the bottom of the front end. In practical applications, different heat dissipation manners can be selected according to the working state of the UAV 100, the operation state of the cooling fan, and other information.

Figure 5:
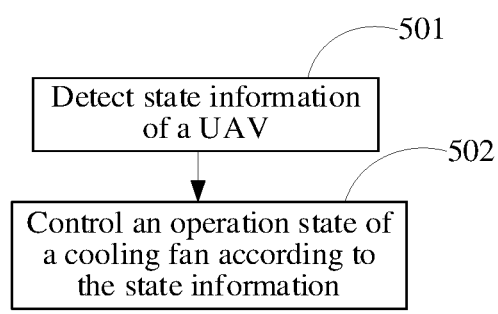
FIG. 5 is a flowchart of a heat dissipation method according to an embodiment of the present disclosure.

Based on the above-described different heat dissipation manners, a heat dissipation method is provided according to the present disclosure. FIG. 5 is a flowchart of the heat dissipation method provided by the present disclosure. The method can be implemented by, e.g., a UAV flight control system.

Referring to FIG. 5, at 501, state information of the UAV is detected.

In some embodiments, a cooling fan may be provided at the housing of the UAV for dissipating heat from a heating element, and a cooling air duct may be provided for dissipating heat from the heating element utilizing the airflow generated when the propeller of the UAV rotates. For the UAV, the following heat dissipation manners can be provided: using the cooling fan to dissipate heat from the heating element, using the airflow generated when the propeller rotates to dissipate heat from the heating element, and using both. For a certain state of the UAV, one of the above heat dissipation manners for cooling may be chosen. Thus, the state information of the UAV can be detected to adjust the heat dissipation manner according to the state information.

At 502, an operation state of the cooling fan is controlled according to the state information.

In some embodiments, after the state information of the UAV is detected, the operation state of the cooling fan can be controlled according to the state information.

In some embodiments, controlling the operation state of the cooling fan may include starting the cooling fan, turning off the cooling fan, and adjusting the rotation speed of the cooling fan. Therefore, according to the state information, through the above-described control of the cooling fan, such as starting the cooling fan or adjusting the rotation speed of the cooling fan, the cooling fan can realize the cooling of the heating element of the UAV, or the cooling fan and the airflow generated during rotation of the propeller can realize the cooling of the heating elements of the UAV. When the cooling fan is turned off, the airflow generated during rotation of the propeller can realize the cooling of the UAV.

Therefore, when the airflow generated by the rotation of the propeller is used to dissipate heat from the heating elements in the UAV, the power consumption of the UAV can be saved, which is helpful in increasing the flight time of the UAV. When the propeller is not working, but the UAV needs heat dissipation, the cooling fan can be used to dissipate heat to meet the heat dissipation need. When the above two heat dissipation manners are both used and the heat dissipation direction of the cooling fan and the heat dissipation direction of the airflow generated when the propeller rotates are the same, the heat dissipation efficiency of the UAV can be further improved.

Based on the description of the above heat dissipation manners, different controls according to the state information of the UAV are described as follows.

in some embodiments, the state information of the UAV includes a working state of the UAV. In some embodiments, the working state of the UAV may include a flight state or a standby state. The flight state refers to a state in which the UAV's power components provide the flying power of the UAV during the flight and the standby state refers to a state in which the UAV has been powered on but has not yet flown.

In some embodiments, when the working state of the UAV is the flight state, then controlling the operation state of the cooling fan according to the state information (502) includes turning off the cooling fan in response to the working state being the flight state. At this time, the airflow generated when the propeller of the UAV rotates can be used to dissipate heat from the heating element. Because the cooling fan is turned off, the power consumption caused by turning on the cooling fan can be reduced, which is conducive to improving the endurance of the UAV.

In some embodiments, when the working state of the UAV is the standby state, then controlling the operation state of the cooling fan according to the state information (502) includes, turning on the cooling fan in response to the working state being the standby state. At this time, the propeller of the UAV is not rotating but the heating element of the UAV may still generate a large amount of heat, and hence the cooling fan can be used to dissipate the heat generated by the heating element.

In some embodiments, only the working state of the UAV may need to be detected, and the cooling fan may be turned on or off according to the working state of the UAV 100.

In some embodiments, the state information of the UAV includes the working state of the UAV and the temperature information of the heating element.

In some embodiments, controlling the operation state of the cooling fan according to the state information (502) includes turning off the cooling fan in response to the temperature information indicating that the temperature of the heating element is lower than a first threshold, or starting the cooling fan in response to the temperature information indicating the temperature of the heating element is not lower than the first threshold. The first threshold can be determined according to the working state of the UAV. That is, the value of the first threshold can depend on whether the UAV is in the flight state or the standby state. For example, when the UAV is in the flight state, if the temperature information indicates that the temperature of the heating element is less than 65 degrees, the cooling fan can be turned off, and the airflow generated when the propeller rotates is used to dissipate heat. When the temperature information indicates that the temperature of the heating element is not less than 65 degrees, the cooling fan can be started, and the airflow generated by the propeller rotation and the cooling fan can be used jointly to dissipate heat to improve heat dissipation efficiency. When the UAV is in the standby state, if the temperature information indicates that the temperature of the heating element is lower than 60 degrees, the cooling fan can be turned off, and when the temperature information indicates that the temperature of the heating element is not lower than 60 degrees, the cooling fan can be started and used for heat dissipation. The first threshold described above is only an example. In practical applications, the first threshold may be set according to the working state of the UAV and is not limited here.

The temperature information of the heating element may be temperature information about the surface of the heating element (such as temperature information obtained from one or more points on the surface), or temperature information of the environment in which the heating element is located, or other temperature information as long as the temperature information can indicate the relevant temperature of the heating element to determine whether the heating element can withstand the relevant temperature, which is not limited here.

Further, when the temperature information indicates that the temperature of the heating element is not lower than the first threshold, starting the cooling fan may include determining a target speed of the cooling fan according to the correspondence between the temperature information and the speed of the cooling fan, and controlling the cooling fan to run according to the target speed. The correspondence can be determined by the working state.

In some embodiments, when the working state of the UAV is the flight state, if the cooling fan is started, the cooling fan can be controlled to run at a certain preset speed according to the temperature information, so as to simultaneously use the cooling fan and the airflow generated when the propeller of the UAV rotates to dissipate heat from the heating element. When the working state of the UAV is the standby state, the cooling fan can be started and controlled to run at a different preset speed according to the temperature information. At this time, the propeller has not yet rotated, but the different cooling efficiency of the cooling fan can be used to dissipate heat from the heating element.

In the corresponding working state of the UAV, the temperature level can be set according to the corresponding first threshold, and the corresponding rotation speed of the cooling fan can be set at the corresponding temperature level. For example, when the working state of the UAV is the standby state, and when the temperature information indicates that the temperature of the heating element is between 60 degrees and 80 degrees, the cooling fan can be controlled to run at 60% of its maximum speed, and the cooling fan can dissipate heat from the heating element at a heat dissipation efficiency corresponding to 60% of its maximum rotation speed. When the temperature information indicates that the temperature of the heating element is higher than 80 degrees, the cooling fan can be controlled to run at its maximum speed, and the cooling fan can dissipate heat from the heating element at a heat dissipation efficiency corresponding to the maximum speed. In some other embodiments, the correspondence between the temperature information in the standby state and the rotation speed of the cooling fan may be set according to specific needs and is not limited thereto.

For another example, when the working state of the UAV is the flight state and when the temperature information indicates that the temperature of the heating element is between 65 degrees and 85 degrees, the cooling fan is controlled to run at 60% of its maximum speed, and airflow generated by the operation of the cooling fan and the airflow generated by the rotation of the propeller are used to dissipate heat from the heating element. When the temperature information indicates that the temperature of the heating element is higher than 85 degrees, the cooling fan is controlled to run at its maximum speed, and the airflow generated by the operation of the cooling fan and the airflow generated by the rotation of the propeller are used to dissipate heat from the heating element. In some other embodiments, in the flight state, the correspondence between the temperature information and the rotation speed of the cooling fan may be set according to specific needs and is not limited thereto.

In some embodiments, the airflow generated by the cooling fan and the airflow generated by the rotation of the propeller can share a cooling air duct. Then, when the air inlet of the cooling fan is close to the inlet of the airflow, the cooling direction of the cooling fan can be the same as the cooling direction of the airflow. Thus, the cooling fan can be selectively turned on or off in order to use the airflow generated by the rotation of the propeller to dissipate heat, or use the cooling fan to dissipate heat, or use the airflow generated by the cooling fan and also by the rotation of the propeller to dissipate heat. When the air inlet of the cooling fan is close to the outlet of the airflow, the cooling direction of the cooling fan is opposite to the cooling direction of the airflow. At this time, the cooling fan can be selectively turned on or off in order to use the airflow generated when the propeller rotates to dissipate heat or use the cooling fan to dissipate heat.

When the airflow generated by the cooling fan and the airflow generated when the propeller rotates share the cooling air duct, the cooling fan can be arranged at different positions to meet the design of the cooling direction. In practical applications, the cooling air duct corresponding to the cooling fan may be different from the cooling air duct corresponding to the airflow generated when the propeller rotates, which is not limited here.

The above heat dissipation method can be applied to any heat dissipation structure or UAV with a cooling fan and a cooling air duct that dissipates heat from the heating element using the airflow generated when the propeller of the UAV rotates. It can also be applied to the heat dissipation structure and the UAV in the present disclosure.

In some embodiments, the housing to which the heat dissipation method is applied includes the first air vent 41 and the second air vent 42 as shown in FIG. 3. The first air vent 41 is used to guide the airflow generated when the propeller 30 of the UAV 100 rotates into the housing 40 through the first air vent 41. The second air vent 42 is used to discharge the airflow after heat transfer with the heating element 50 out of the housing 40. The side projection of the first air vent 41 and the side projection of the propeller 30 at least partially overlap.

In some embodiments, as shown in FIG. 3, the height of the upper end of the first air vent 41 is higher than or equal to the height of the upper end of the propeller 30, and the height of the lower end of the first air vent 41 is not higher than the height of the lower end of the propeller 30.

In some embodiments, as shown in FIG. 3, the top of the housing 40 is provided with the first plate 43, the second plate 44 and the connection wall 45 connecting the first plate 43 and the second plate 44. The first air vent 41 is disposed at the connection wall 45, and the platform height of the first plate 43 is different from the platform height of the second plate 44.

In some embodiments, as shown in FIG. 3, the platform height of the first plate 43 is higher than the height of the upper end of the propeller 30, and when the propeller 30 rotates to form an area of rotation, the projection of the second plate 44 on the area of rotation at least partially overlaps with the area of rotation.

In some embodiments, as shown in FIG. 3, the first air vent 41 is provided with a deflector extending from the direction of the airflow generated when the propeller 30 rotates to the inside of the housing 40.

In some embodiments, as shown in FIG. 3, the housing 40 is further provided with a third air vent 46, which is used to cooperate with the first air vent 41.

In some embodiments, as shown in FIG. 3, a shunt structure 60 is provided at the housing 40, and the shunt structure 60 is used to divide and guide the cooling airflow passing through the shunt structure 60.

Figure 6:
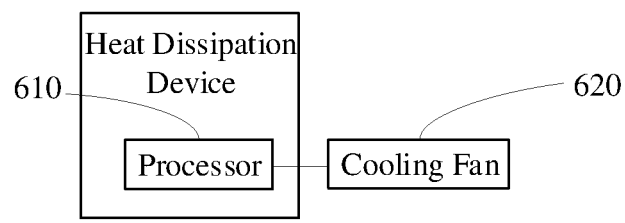
FIG. 6 is a schematic block diagram of a heat dissipation device according to an embodiment of the present disclosure.

FIG. 6 shows a heat dissipation device consistent with the present disclosure. The heat dissipation device is applied to a UAV. The heat dissipation device includes a processor 610 (such as a single-core or multi-core processor). The processor 610 can communicate with a cooling fan 620 built in the UAV.

The heat dissipation device may include the cooling fan 620 or may be a separate component of the UAV from the cooling fan 620, which is not limited here.

The processor 610 may be a central processing unit (CPU). The processor 610 may further include a chip. The above-described chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Further, the processor 610 includes one or more, working individually or collectively.

In some embodiments, the processor 610 is used to detect the state information of the UAV and control the operation state of the cooling fan 620 according to the state information. The housing of the UAV is provided with a cooling fan 620 that dissipates heat from the heating element and a cooling air duct that dissipates heat from the heating element by using the airflow generated when the propeller of the UAV rotates.

In some embodiments, the state information includes a working state of the UAV.

In some embodiments, when the state information includes the working state, the processor 610 is configured to turn off the cooling fan 620 if the working state is a flight state or start the cooling fan 620 if the working state is a standby state.

In some embodiments, the state information includes the working state of the UAV or temperature information of the heating element.

In some embodiments, when the state information includes the working state of the UAV and the temperature information of the heating element, the processor 610 is configured to turn off the cooling fan 620 if the temperature information indicates that the temperature of the heating element is lower than a first threshold, or start the cooling fan 620 if the temperature information indicates that the temperature of the heating element is not lower than the first threshold. The first threshold is determined according to the working state.

In some embodiments, the processor 610 is configured to determine a target speed of the cooling fan 620 according to the correspondence between the temperature information and the rotation speed of the cooling fan 620 and control the cooling fan 620 to run according to the target speed. The correspondence can be determined by the working state.

In some embodiments, the working state includes a flight state or a standby state.

In some embodiments, the cooling fan 620 shares a cooling air duct with the airflow.

In some embodiments, when the air inlet of the cooling fan 620 is close to the inlet of the airflow, the cooling direction of the cooling fan 620 is the same as the cooling direction of the airflow.

In some embodiments, when the air inlet of the cooling fan 620 is close to the outlet of the airflow, the cooling direction of the cooling fan 620 is opposite to the cooling direction of the airflow.

In some embodiments, the housing is provided with a first air vent and a second air vent. The first air vent is used to guide the airflow generated when the propeller of the UAV rotates into the housing through the first air vent. The second air vent is used to discharge the airflow after heat transfer with the heating element out of the housing. The side projection of the first air vent and the side projection of the propeller at least partially overlap.

In some embodiments, the height of the upper end of the first air vent is higher than or equal to the height of the upper end of the propeller, and the height of the lower end of the first air vent is not higher than the height of the lower end of the propeller.

In some embodiments, the top of the housing is provided with a first plate, a second plate and a connection wall connecting the first plate and the second plate. The first air vent is disposed at the connection wall, and the platform height of the first plate is different from the platform height of the second plate.

In some embodiments, the platform height of the first plate is higher than the height of the upper end of the propeller, and when the propeller rotates to form an area of rotation, the projection of the second plate on the area of rotation overlaps with the area of rotation.

In some embodiments, the first air vent is provided with a deflector extending from the direction of the airflow generated when the propeller rotates to the inside of the housing.

In some embodiments, the housing is further provided with a third air vent, which is used to cooperate with the first air vent.

In some embodiments, a shunt structure is provided at the housing, and the shunt structure is used to divide and guide the cooling airflow passing through the shunt structure.

Based on the description of the above heat dissipation device, an unmanned aerial vehicle (UAV) is further provided according to an embodiment of the present disclosure. The UAV includes a body, an arm connected to the body, and a propeller connected to the arm, and may also include the above heat dissipation device.

If a module/unit integrated with the heat dissipation device is implemented in a form of a software functional unit and sold or used as a standalone product, it may be stored in a computer-readable storage medium. All or part of the processes in the methods of the above embodiments of the present disclosure can also be implemented by a computer program instructing relevant hardware. The computer program can be stored in a computer-readable storage medium. When the program is executed by the processor, the processes of the foregoing method of the embodiments may be implemented. The computer program includes computer program code, and the computer program code may be in the form of source code, object code, executable file, or some intermediate form. The computer-readable medium may include any entity or device capable of carrying the computer program code, such as a recording medium, a U disk, a portable hard disk, a magnetic disk, an optical disk, a computer memory, a read-only memory (ROM), a random-access memory (RAM), electrical carrier signals, telecommunications signals and software distribution media, etc. The content contained in the computer-readable medium can be appropriately increased or decreased according to the requirements of legislation and patent practice in jurisdictions. For example, in some jurisdictions, according to legislation and patent practice, computer-readable media does not include electrical carrier signals and telecommunications signals.

In the present disclosure, relational terms such as "first" and "second" are only used to distinguish one entity or operation from another entity or operation, and do not necessarily require or imply that there is any such actual relationship or order between these entities or operations. The term "comprising," "including" or any other variation thereof is non-exclusive inclusion, such that a process, method, article, or device that include a series of elements include not only those elements but also other elements that are not explicitly listed, or elements that are inherent to such a process, method, article, or device. Without more restrictions, the elements defined by the sentence "including a . . . " do not exclude the existence of other identical elements in the process, method, article, or equipment that includes the elements.

The methods and devices provided by the present disclosure are described in detail above. Specific examples are used to explain the principles and implementation of the present disclosure. The descriptions of the above embodiments are only for facilitating the understanding of the present disclosure; meanwhile, for a person of ordinary skill in the art, according to the present disclosure, there will be changes in the specific implementation and application. In summary, the content of this specification is not a limitation to this disclosure.

What is claimed is:

1. A heat dissipation structure comprising:
a housing configured to accommodate a heating element of an aerial vehicle, the housing including:
a first air vent configured to guide an airflow into the housing, the airflow including a propeller-generated airflow generated by a propeller of the aerial vehicle during rotation;
a second air vent configured to guide the airflow out of the housing;
wherein:
the housing is located at an end of an arm of the aerial vehicle, away from the propeller in a longitudinal direction of the arm; and
a projection of the housing on a plane on which an area of rotation of the propeller lies at least partially overlaps the area of rotation of the propeller.

2. The heat dissipation structure of claim 1, wherein a projection of the first air vent on a plane perpendicular to the plane on which the area of rotation of the propeller lies at least partially overlaps a projection of the propeller on the plane perpendicular to the plane on which the area of rotation of the propeller lies.

3. The heat dissipation structure of claim 1, wherein the propeller includes a hub and a blade mounted on the hub.

4. The heat dissipation structure of claim 1, wherein:
the first air vent is an air vent in two groups of first air vents symmetrical about a longitudinal axis of the housing;
the propeller is one of a pair of propellers provided at a rear end of the housing; and
the two groups of first air vents correspond to the pair of propellers.

5. The heat dissipation structure of claim 1, wherein a height of an upper end of the first air vent is higher than or equal to a height of an upper end of the propeller, and a height of a lower end of the first air vent is not higher than a height of a lower end of the propeller.

6. The heat dissipation structure of claim 1, wherein:
the housing further includes a first plate, a second plate, and a connection wall connecting the first plate and the second plate at a top of the housing;
the first air vent is disposed at the connection wall; and
a platform height of the first plate is different from a platform height of the second plate.

7. The heat dissipation structure of claim 6, wherein the second plate extends in a horizontal direction away from the connection wall or obliquely downward away from the connection wall.

8. The heat dissipation structure of claim 6, wherein a projection of the second plate on the plane on which the area of rotation of the propeller lies at least partially overlaps the area of rotation of the propeller.

9. The heat dissipation structure of claim 6, wherein the first plate, the second plate, and the connection wall are an integral piece.

10. The heat dissipation structure of claim 1, wherein:
the first air vent includes a deflector extending into the housing along a direction of the propeller-generated airflow.

11. The heat dissipation structure of claim 1, further comprising:
a heat sink disposed at the housing and configured to dissipate heat from the heating element.

12. The heat dissipation structure of claim 11, further comprising:
a wind shield;
wherein:
the heat sink includes a plurality of heat dissipation fins, a plurality of heat dissipation channels being formed among the plurality of heat dissipation fins; and
the wind shield forms a closed air duct from the heat dissipation channels to the first air vent.

13. The heat dissipation structure of claim 1, further comprising:
a shunt structure in the housing and configured to divide and guide the airflow passing through the shunt structure.

14. An aerial vehicle comprising:
a housing;
a heating element accommodated in the housing;
a propeller; and
an actuator configured to drive the propeller;
wherein:
the actuator is located outside the housing;
the housing includes:
a first air vent configured to guide an airflow into the housing, the airflow including a propeller-generated airflow generated by the propeller during rotation; and
a second air vent configured to guide the airflow out of the housing; and
a projection of the housing on a plane on which an area of rotation of the propeller lies at least partially overlaps the area of rotation of the propeller.

15. The aerial vehicle of claim 14, wherein a projection of the first air vent on a plane perpendicular to the plane on which the area of rotation of the propeller lies at least partially overlaps a projection of the propeller on the plane perpendicular to the plane on which the area of rotation of the propeller lies.

16. The aerial vehicle of claim 14, wherein:
the housing further includes a first plate, a second plate, and a connection wall connecting the first plate and the second plate at a top of the housing;
the first air vent is disposed at the connection wall; and
a platform height of the first plate is different from a platform height of the second plate.

17. The aerial vehicle of claim 16, wherein the second plate extends in a horizontal direction away from the connection wall or obliquely downward away from the connection wall.

18. The aerial vehicle of claim 16, wherein the first plate, the second plate, and the connection wall are an integral piece.

19. The aerial vehicle of claim 14, wherein the housing includes a curved surface or a spherical crown that gradually lowers from a middle of a top to a periphery.

20. The aerial vehicle of claim 14, wherein:
the first air vent is an air vent in two groups of first air vents symmetrical about a longitudinal axis of the housing;
the propeller is one of a pair of propellers provided at a rear end of the housing; and
the two groups of first air vents correspond to the pair of propellers.

* * * * *